United States Patent
Ward et al.

[19]

[11] Patent Number: 5,480,183
[45] Date of Patent: Jan. 2, 1996

[54] AIRBAG COVER RETAINER

[75] Inventors: Michael J. Ward, Liberty, Utah; Steven R. Fredin, Rochester Hills; Russell S. Gans, Westland, both of Mich.

[73] Assignee: Morton International, Inc., Chicago, Ill.

[21] Appl. No.: 329,069

[22] Filed: Oct. 21, 1994

[51] Int. Cl.$^6$ .................................................. B60R 21/16
[52] U.S. Cl. ........................ 280/728.2; 280/728.3; 280/732
[58] Field of Search ................... 280/728.2, 728.3, 280/731, 732

[56] References Cited

U.S. PATENT DOCUMENTS

| | | | |
|---|---|---|---|
| 3,514,124 | 5/1970 | Richardson | 280/732 |
| 3,630,472 | 12/1971 | Axenborg | 244/32 |
| 3,632,132 | 1/1972 | Richardson | 280/728.1 |
| 3,643,971 | 2/1972 | Kushnick | 280/732 |
| 4,400,010 | 8/1983 | Stutz et al. | 280/732 |
| 4,773,673 | 9/1988 | Sakurai | 280/732 |
| 4,842,299 | 6/1989 | Okamura et al. | 280/732 |
| 4,893,833 | 1/1990 | DiSalvo et al. | 280/732 |
| 4,973,081 | 11/1990 | Rafferty | 280/728.2 |
| 5,046,758 | 9/1991 | Rafferty et al. | 280/728.3 |
| 5,094,476 | 3/1992 | Chihaya | 280/743 |
| 5,096,222 | 3/1992 | Komerska et al. | 280/732 |
| 5,145,207 | 9/1992 | Bederka et al. | 280/732 |
| 5,161,819 | 11/1992 | Rhodes, Jr. | 280/728.3 |
| 5,195,775 | 3/1993 | Komerska et al. | 280/732 |
| 5,211,421 | 5/1993 | Catron et al. | 280/728.2 |
| 5,242,191 | 9/1993 | Faigle et al. | 280/732 |
| 5,242,192 | 9/1993 | Prescaro et al. | 280/730 |

Primary Examiner—Kenneth R. Rice
Attorney, Agent, or Firm—George W. Rauchfuss, Jr.; Gerald K. White

[57] ABSTRACT

The requirement for a hinge, tether, or other connection between the breakaway door of an automotive airbag installation and a fixed attachment point is eliminated. This is accomplished by substituting a pressure-sensitive material connecting the door with the material of the airbag itself.

3 Claims, 1 Drawing Sheet

AIRBAG COVER RETAINER

TECHNICAL FIELD

This invention relates to the field of automotive airbag assemblies.

BACKGROUND ART

A conventional automotive airbag module includes a reaction canister which holds a folded airbag in such a manner that it may be inflated by gases produced by an inflator. The reaction canister is normally mounted behind a portion of the interior trim of the motor vehicle which may, for example, comprise the central portion of a steering wheel or a portion of the instrument panel forward of a passenger's location. This interior trim is normally a sheet-like member such as textured vinyl which is designed with a breakaway portion which forms a door under the influence of the expanding airbag.

It is important to restrain the door from flying into the vehicle interior during airbag expansion. This objective has been achieved in the prior art by designing the breakaway portion in such a fashion as to form a hinge for retaining the door in place. Alternatively, or in addition, a tether may be provided which connects the door to the airbag module to restrict door movement. The need for designing a hinge into the vehicle's interior trim introduces a complexity which it would be desirable to avoid. The need to break away the door from the integral trim requires an undesirable impact force to the instrument panel in a passenger-side installation. It has also been a problem in a passenger-side installation to achieve the desired fit and finish of the airbag cover to the instrument panel because of the need for attachment of the airbag cover to the airbag module.

Accordingly, it is a primary object of the present invention to provide an automotive airbag installation which eliminates the connection of the airbag door to a fixed attachment point within the vehicle. Another object is to simplify the manufacture and assembly of automotive airbag installations. Other objects, features, and advantages will become apparent from the following description and appended claims.

DISCLOSURE OF INVENTION

The folded airbag in a vehicle airbag assembly is directly attached to a door positioned within the vehicle's interior trim. Prior to inflation, it holds the door in its closed position. During inflation, it restrains the door from flying into the passenger compartment.

BEST MODE FOR CARRYING OUT THE INVENTION

Figure 1:
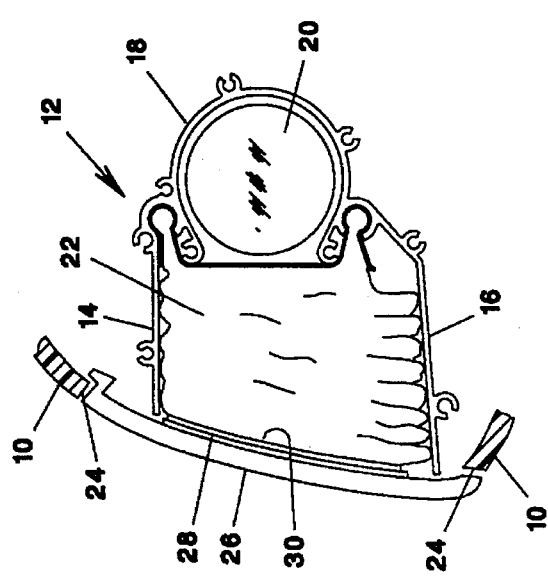
FIG. 1 is a side view of a passenger-side airbag module in accordance with the invention with an endplate of the reaction canister removed to reveal its interior.

FIG. 1 illustrates an airbag module positioned behind the instrument panel 10 of a vehicle. The module comprises a reaction canister 12 which is in the form of a trough having sidewalls 14, 16 joined by a semi-cylindrical floor 18. Housed within the reaction canister 12 and adjacent the floor 18 is a cylindrical inflator 20. A folded airbag 22 is housed within the canister 12 in such a fashion that its open mouth is positioned to receive gases generated by the inflator 20. The two ends of the reaction canister are normally closed by endplates. In FIG. 1 the near endplate is removed to illustrate the construction. The features of the module thus far described are conventional and need not be described in further detail.

The instrument panel 10 defines a cutout 24. Within this cutout is mounted a door 26. Normally, in prior art installations, the door 26 would be a breakaway portion of the instrument panel 10. After breaking away, a hinge would remain, securing the door to the instrument panel. Alternatively, or in addition, a tether would be provided connecting the door to the module assembly. Din accordance with the present invention, however, these features are optional and may be completely omitted.

Figure 2:
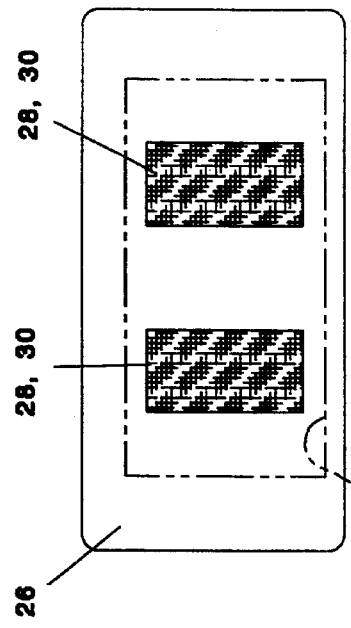
FIG. 2 is a schematic illustration in reduced scale illustrating the placement of the material interconnecting the airbag and door.

In accordance with the present invention, the door 26 is retained within the cutout 24 and is restrained during airbag deployment by pressure-sensitive attachment to the airbag 22 itself. As used herein, the term "pressure-sensitive" refers to an interconnection between the airbag 22 and the door 26 which becomes firmer upon force being applied therebetween but which can be readily separated or torn apart when desired. The specific material disclosed herein is a hook and loop tear-apart fastener sold under the trademark VELCRO® by Velcro USA Inc., Manchester, N.H. In the disclosed embodiment, a strip 28 of either the hook or loop portion of the fastener is secured to the door 26 and the mating strip 30 of the hook and loop fastener is secured to the surface of the airbag 22. It will be understood that many patterns of application of the pressure-sensitive material may be employed. FIG. 2 schematically illustrates one possible pattern. In this arrangement, two sets of interlocked strips 28, 30 are mounted so as to be positioned within the open mouth 32 of the reaction canister 12 and against the inner surface of the door 26.

Figure 3:
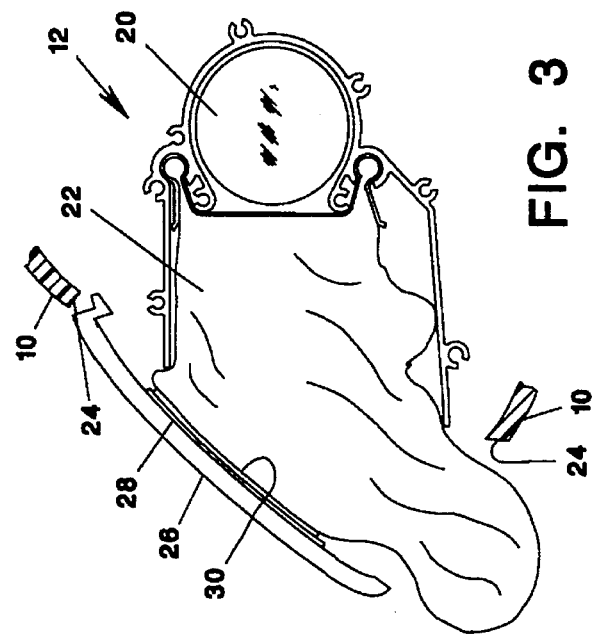
FIG. 3 illustrates the operation of the invention during airbag expansion.

FIG. 3 illustrates the action of this invention upon airbag expansion. As the airbag 22 expands under the influence of gas from inflator 20, the surface of the airbag and its mounted strips 30 press firmly against the mating strips 28 mounted upon the door 26. As a result, the door 26 is retained upon the surface of the inflated airbag, preventing it from being propelled into the passenger compartment.

As it is not necessary to break the door 26 away from the instrument panel 10, the impact force to the instrument panel is substantially reduced. Furthermore, as there is no fixed attachment of the door 26 to the airbag module, the fit and finish of the door 26 relative to the instrument panel 10 prior to inflation is enhanced.

The foregoing description has been primarily directed to use of the invention in a passenger-side airbag assembly. However, it will be understood that the principles involved make it equally applicable to use within a drivers' side airbag assembly which might be housed, for example, within a steering wheel.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an automotive vehicle airbag assembly including a reaction canister having an open mouth, an inflator, a folded airbag within said canister positioned to be inflated by said inflator, a door normally closing the open mouth of said canister and forming a portion of the interior trim of said vehicle but openable under the influence of the expanding airbag to permit the airbag's expansion into the interior of said vehicle, and means for securing said door in a closed position prior to airbag inflation and restraining motion of said door during such inflation, the improvement wherein said securing and restraining means comprises:

a pressure-sensitive material interconnecting said airbag and door whereby the folded airbag maintains said door in its closed position prior to inflation and retains its interconnection with said door during inflation.

2. The improvement of claim 1 wherein said pressure-sensitive material comprises:

a first sheet-like member attached to said door; and a second sheet-like member attached to said airbag in engagement with said first sheet-like member.

3. The improvement of claim 2 wherein said pressure-sensitive material is a hook and loop tear-apart fastener and one of said first and second sheet-like members carries loops and the other carries hooks.

* * * * *